(12) United States Patent
Tunzini

(10) Patent No.: US 6,572,126 B2
(45) Date of Patent: Jun. 3, 2003

(54) WISHBONE OF A WHEEL-SUSPENSION SYSTEM

(75) Inventor: Simon Tunzini, Winterthur (CH)

(73) Assignee: Georg Fischer Fahrzeugtechnik AG, Schaffhausen (CH)

(*) Notice: Subject to any disclaimer, the term of this patent is extended or adjusted under 35 U.S.C. 154(b) by 27 days.

(21) Appl. No.: 09/883,519

(22) Filed: Jun. 18, 2001

(65) Prior Publication Data

US 2002/0000705 A1 Jan. 3, 2002

(30) Foreign Application Priority Data

Jun. 19, 2000 (DE) .......................... 100 29 189

(51) Int. Cl.$^7$ ................................ B60G 3/00
(52) U.S. Cl. ................... 280/124.134; 280/124.153
(58) Field of Search ............. 280/124.134, 124.135, 280/124.136, 124.138, 124.141, 124.142, 124.143, 124.145, 124.15, 124.151, 124.153

(56) References Cited

U.S. PATENT DOCUMENTS

| | | | | |
|---|---|---|---|---|
| 2,039,670 A | * | 5/1936 | Wagner | ............... 280/124.141 |
| 3,110,505 A | * | 11/1963 | Gladden | ............... 280/124.142 |
| 4,132,431 A | * | 1/1979 | von der Ohe | ......... 280/124.137 |
| 4,556,234 A | | 12/1985 | Mahnig et al. | |
| 5,516,130 A | * | 5/1996 | Mitchell | ............... 280/124.134 |
| 5,607,177 A | | 3/1997 | Kato | |
| 5,938,220 A | * | 8/1999 | Torneld | ............... 280/124.145 |
| 5,992,867 A | * | 11/1999 | Kato et al. | ............ 280/124.134 |
| 6,116,626 A | * | 9/2000 | Cherry et al. | ......... 280/124.135 |

FOREIGN PATENT DOCUMENTS

| | | |
|---|---|---|
| DE | 38 00 944 | 1/1989 |
| GB | 2205074 | 11/1988 |

* cited by examiner

Primary Examiner—Paul N. Dickson
Assistant Examiner—David R. Dunn
(74) Attorney, Agent, or Firm—Bachman & LaPointe, P.C.

(57) ABSTRACT

A wishbone of a wheel-suspension system for a motor-vehicle wheel, comprising a one-piece casting with a first fixing zone for fixing to a bearing arrangement of the wheel, a pair of second fixing zones for fixing to a chassis of the motor vehicle, and a flat zone with at least one aperture, the aperture being of dumbbell-shaped and/or kidney-shaped design.

13 Claims, 3 Drawing Sheets

WISHBONE OF A WHEEL-SUSPENSION SYSTEM

BACKGROUND OF THE INVENTION

The invention relates to a wishbone of a wheel-suspension system for a motor-vehicle wheel, comprising a one-piece casting with a fixing zone for fixing to a bearing arrangement of the wheel, with further fixing zones for fixing to a chassis of the motor vehicle, and with a flat zone with at least one aperture.

In motor-vehicle construction, wishbones are used to control and steer the wheels. At one end, the wishbone makes the connection to the bearing arrangement of the wheel and, at the other end, it makes the connection to the chassis of the vehicle. In addition to the wheel bearing and the drive shaft, the bearing arrangement also includes a pivot bearing, a connection to the axle stub and to a control joint, to the track rod and further elements for the steering, driving, suspension and braking of the vehicle. During operation of the vehicle, the wishbone is subject to many different stresses. For this reason; two wishbones per wheel are often provided. The high stresses on the wishbone can be absorbed by using a particularly strong and sturdy construction. Such a construction often entails a high weight as well, and this leads to higher fuel consumption. The safety of the vehicle in the case of a collision also requires optimum design of the wishbone.

DE 38 00 944 C1 has disclosed a bearing arrangement for a one-piece wishbone of a wheel-suspension system. The wishbone itself is an intrinsically reinforced component, which is connected at the wheel end to the wheel carrier. At the other end, the wishbone is connected to a longitudinal member of the vehicle body by two bearing elements, comprising bearing studs and bearing holes, which are arranged in alignment with one another in the direction of travel. In the event of a collision in or counter to the direction of travel, one of the bearing elements, which is cantilever-mounted, is released. The impact energy is not transmitted to the passenger cell but is absorbed by deformation of the longitudinal member. The relatively rigid and heavy wishbone is also prevented from penetrating the passenger cell. After a collision, it is necessary to replace or repair at least the longitudinal member. Overall, the longitudinal member of a vehicle is significantly heavier and less easily accessible than the wishbone.

Taking this prior art as a starting point, it is the object of the invention to specify a wishbone of a wheel-suspension system by means of which the vehicle's weight and the cost of repair is reduced while meeting higher requirements on vehicle safety and fuel consumption.

SUMMARY OF THE INVENTION

The foregoing object is achieved by a wishbone of a wheel-suspension system for a motor-vehicle wheel, comprising a one-piece casting with a fixing zone for fixing to a bearing arrangement of the wheel, with further fixing zones for fixing to a chassis of the motor vehicle, and with a flat zone with at least one aperture, the aperture being of dumbbell-shaped and/or kidney-shaped design.

It is advantageous that, if the motor vehicle is involved in an impact, the impact energy is absorbed by defined deformation of the wishbone. This is achieved by the fact that, adjacent to the kidney-shaped aperture, the flat zone of the wishbone has a ramp with a wall thickness that increases towards the kidney-shaped aperture.

It is also advantageous that, if the motor vehicle is involved in an impact, the wishbone is deformed in a defined manner without failing by breaking. This is achieved by the fact that a first dumbbell-shaped aperture is arranged between the ramp and the fixing zone for fixing to the bearing arrangement of the wheel. This is achieved by the fact that, between the ends of the dumbbell, the second dumbbell-shaped aperture has a connecting zone which tapers towards the first fixing zone for fixing to the chassis of the motor vehicle.

The apertures and the ramp ensure that there is a considerable weight saving for a comparable strength. The apertures allow dirty water to drain away more easily. The apertures can also be used as ducts for various lines.

BRIEF DESCRIPTIONS OF THE DRAWINGS

An exemplary embodiment of the invention is described with reference to the figures, of which:

DETAILED DESCRIPTION OF THE DRAWINGS

Figure 1:
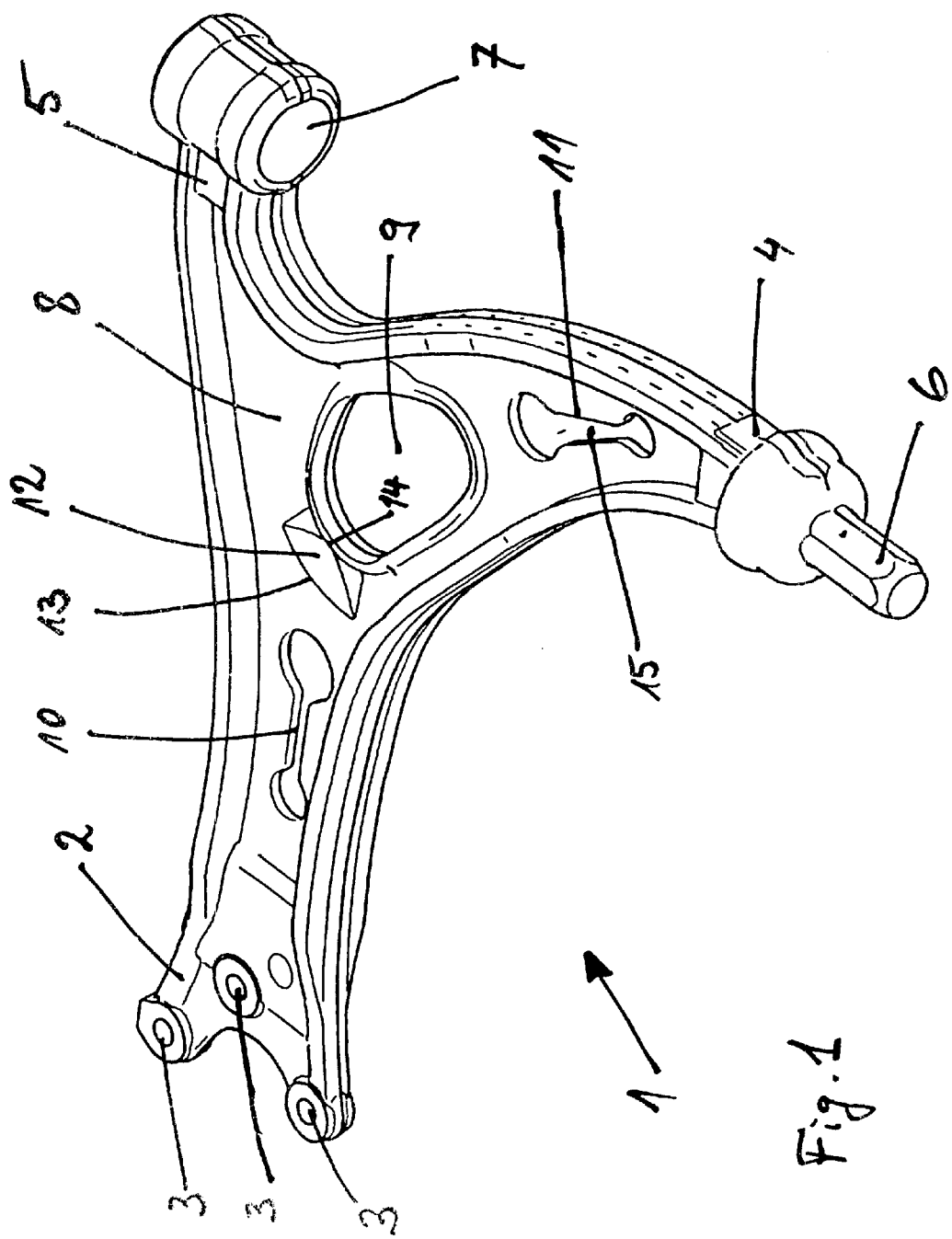
FIG. 1 shows a perspective view of a wishbone according to the invention.

FIG. 1 shows a wishbone 1 for mounting a motor-vehicle wheel. FIG. 1 shows the front left-hand wishbone in perspective by way of example, as viewed from the passenger seat. The wishbone 1 is a relatively flat component, which can be produced as a one-piece casting 1 formed of a material selected from the group consisting of cast steel, cast iron, spheroidal graphite iron, a cast light alloy, cast aluminum and a cast aluminum/magnesium alloy.

A wheel-bearing arrangement (not shown or described in detail here) comprising a wheel carrier, an axle stub and further elements for the steering, suspension, braking and driving of the vehicle are attached to the wishbone on the left-hand side of FIG. 1, i.e. at the front left-hand corner of the vehicle. For this purpose, the wishbone, the one-piece casting 1, has a fixing zone 2 with, for example, three holes 3 for fixing to a bearing arrangement or to a guide member of the wheel. The holes 3 can be inserted into the mould before casting as bushes made of steel or some other alloy so that after casting they will form a strong joint with the fixing zone 2 for fixing the wheel-bearing arrangement (not shown here).

At the end associated with the chassis, which is likewise not shown here, the casting 1 has two further fixing zones 4, 5 for fixing to the chassis of the vehicle. The first chassis-fixing zone 4, which is connected to the chassis on the side associated with the passenger seat, has a bearing stud 6, and the second chassis-fixing zone 5, which is connected to the chassis at the front of the vehicle, has a bearing bush 7. The axes of the bearing stud 6 and of the bearing bush 7 are in alignment with one another. This allows movement of the wheel-fixing zone 2 about an axis extending in the direction of travel. Further resilient elements, e.g. a rubber cushion in the bush 7 or around the stud 6, and the resilient suspension of the wheel thus allow the wheel to move up and down, e.g. when the road is uneven.

Between the wheel-fixing zone 2 and the chassis-fixing zones 4, 5, the casting 1 has a flat zone 8. There are apertures 9, 10, 11 in this flat zone 8. A first, kidney-shaped, aperture 9 is situated close to the centre of gravity of the triangle formed by the three fixing zones 2, 4, 5. There is a ramp 12 adjoining the kidney-shaped aperture 9, between the kidney-shaped aperture 9 and the wheel-fixing zone 2. The ramp 12 is placed like a laterally bevelled prism on the flat zone 8. The ramp 12 begins with a baseline 13 in the flat zone 8 and ends in a point 14, which adjoins one side of the kidney-shaped aperture 9, the side pointing towards the wheel-fixing zone 2.

In the region of the ramp 12, the flat zone 8 has a wall thickness that increases towards the kidney-shaped aperture 9. When a load is imposed, e.g. in the event of a collision, this ramp 12 of variable wall thickness prevents excessive stresses in the flat zone 8. By virtue of the formation of the ramp 12 adjacent to the kidney-shaped aperture 9, the areas of the wishbone 1 that are subjected to tensile and compressive stress are clearly separated from one another. The stresses that occur in the wishbone in this area are distributed more uniformly and are therefore lower. As a result, breakage of the casting 1 is prevented and controlled deformation of the casting is achieved.

The dumbbell-shaped apertures 10, 11 perform the same function. A first dumbbell-shaped aperture 10 is formed between the ramp 12 and the wheel-fixing zone 2. The second dumbbell-shaped aperture 11 is formed between the kidney-shaped aperture 9 and the first chassis-fixing zone 4, which is connected to the chassis on the side associated with the passenger cell. In order to guide the deformation of the wishbone in the desired direction and prevent breakage of the wishbone, the apertures 10, 11 are of dumbbell-shaped design or in the form of keyholes 10, 11. Between the ends of the dumbbell, the second dumbbell-shaped aperture 11 has a connecting zone 15, which tapers towards the first chassis-fixing zone 4.

The design of the ramp 12 and the formation of the kidney-shaped and/or dumbbell-shaped apertures 9, 10, 11 significantly reduce the weight of the wishbone. The wall thickness of the flat zone 8 is reduced to the minimum required to meet safety and strength requirements. If the vehicle is involved in a collision, the wishbone will be deformed but will not break. The impact energy is absorbed by the deformation of the wishbone, not by the deformation of other components of the vehicle to which access is difficult and which perform other functions that are of importance in the design of the vehicle, e.g. supporting the engine block and the passenger cell. In comparison with the longitudinal member, the wishbone is a smaller component of the motor vehicle and one that is easier to replace. Vehicle repair is more convenient and less time-consuming.

Figure 2:
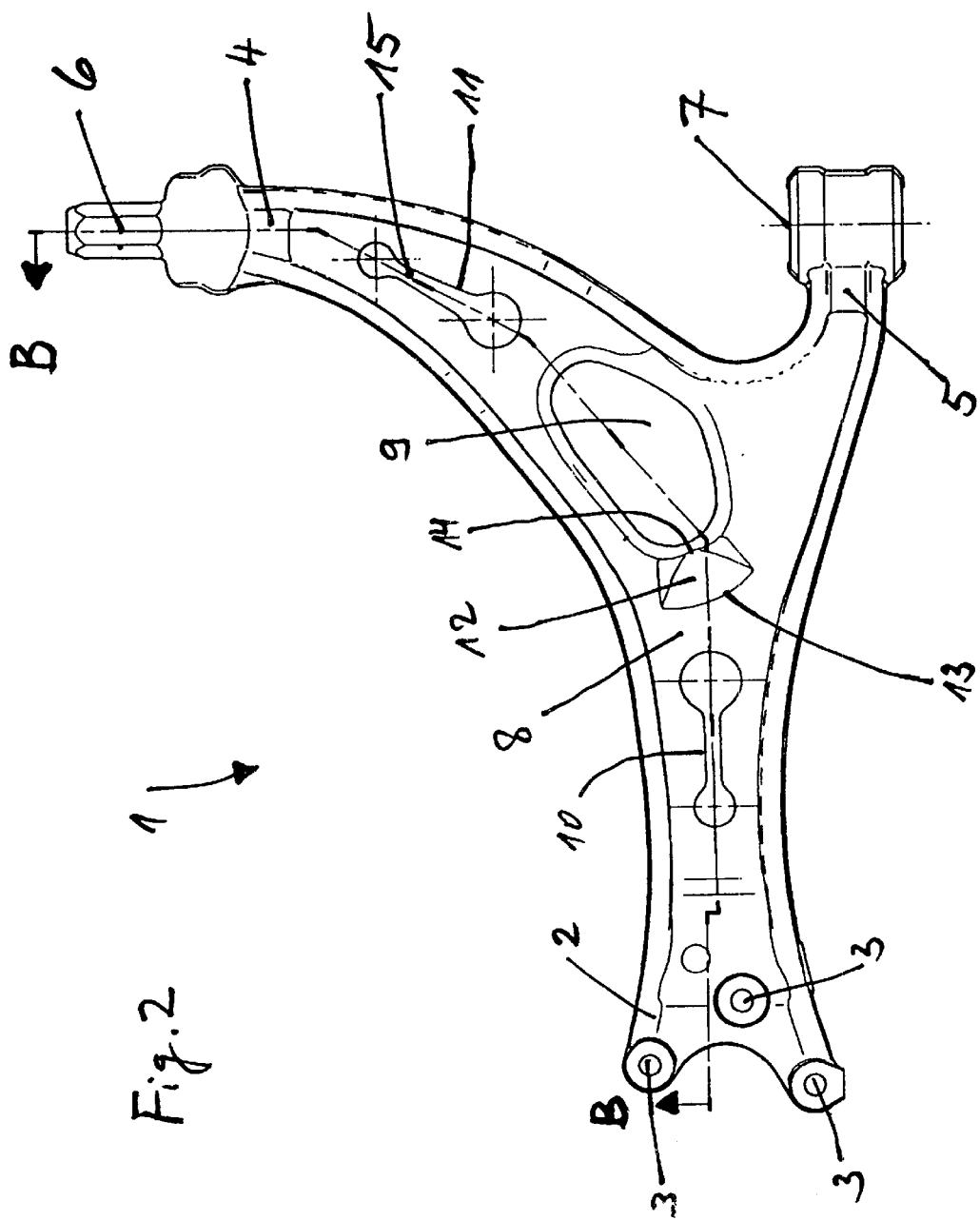
FIG. 2 shows a plan view of the wishbone in FIG. 1.

FIG. 2 shows a plan view of a wishbone 1. This shows particularly clearly how the axes of the bearing stud 6 and the bearing bush 7 are arranged in alignment with one another. The tapering of the connecting zone 15 of the second dumbbell-shaped aperture 11 is also clearly visible. The design of the ramp 12, which extends from the base line 13 to the point 14, with the wall thickness of the flat zone 8 increasing, is likewise visible in FIG. 2.

Figure 3:
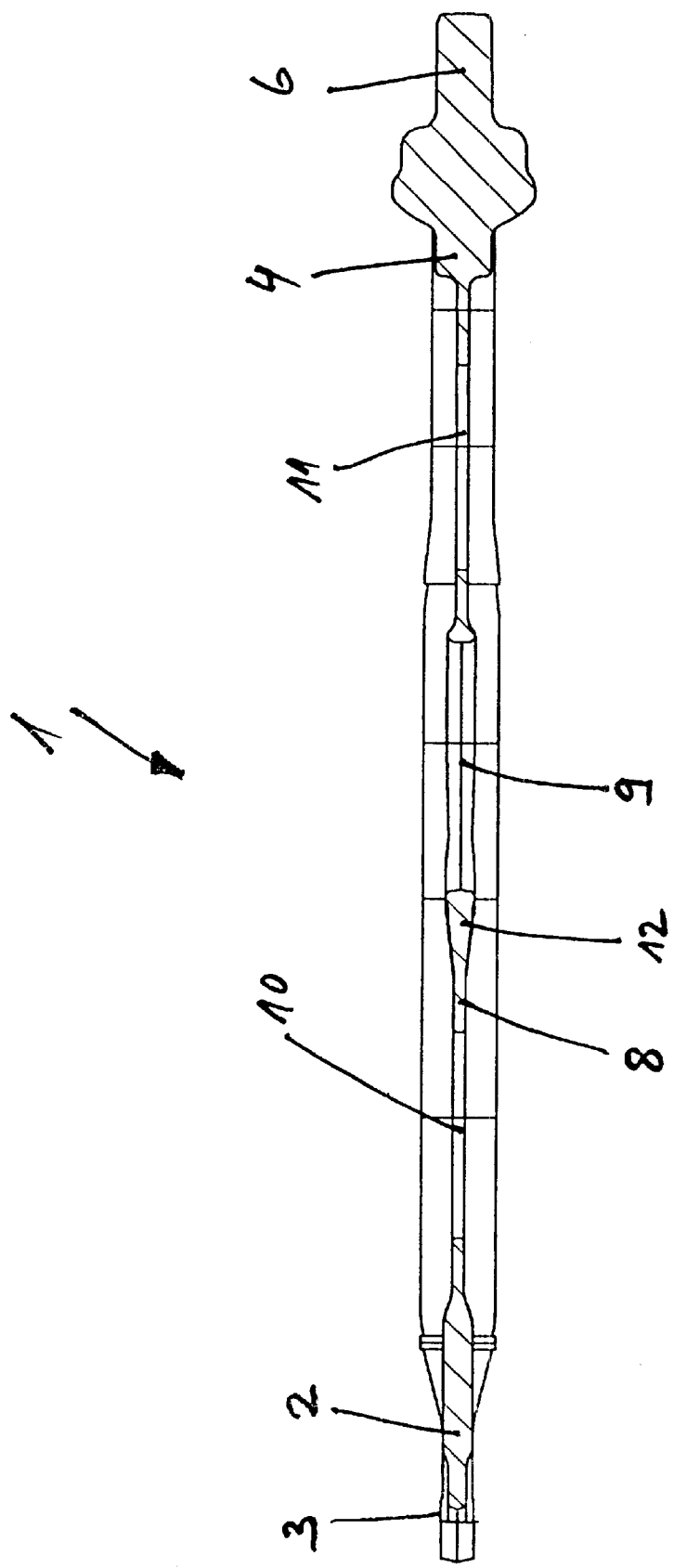
FIG. 3 shows a section through the wishbone along the broken line BB in FIG. 2.

FIG. 3 shows the wishbone 1 according to the invention in section. The section in FIG. 3 is taken along a line indicated as a broken and angled dashed line BB in FIG. 2. The shape of the ramp 9 along the line BB, in particular, is clearly visible in the section in FIG. 3.

What is claimed is:

1. A wheel-suspension system for a motor-vehicle wheel, comprising a one-piece casting with a first fixing zone for fixing to a bearing arrangement of the wheel, a pair of second fixing zones for fixing to a chassis of the motor vehicle, and a flat zone with a first aperture and a second aperture, the second aperture being dumbbell-shaped and located in the flat zone between the first aperture and the first fixing zone.

2. A wheel-suspension system according to claim 1, wherein the first aperture is kidney-shaped.

3. A wheel-suspension system according to claim 1, including a third aperture located between the first aperture and at least one of the pair of second fixing zones.

4. A wheel-suspension system according to claim 1 or 3, wherein adjacent to one side of the first aperture, the flat zone has a ramp with a wall thickness that increases from the flat zone towards the first aperture.

5. A wheel-suspension system according to claim 4, wherein the ramp is arranged adjacent to the flat aperture, on a side facing the first fixing zone.

6. A wheel-suspension system according to claim 4, wherein the dumbbell-shaped aperture is arranged between the ramp and the first fixing zone.

7. A wheel-suspension system according to claim 2, including a second dumbbell-shaped aperture arranged between the kidney-shaped aperture and one of the second fixing zones.

8. A wheel-suspension system according to claim 3, wherein the third aperture is located on a side of the first aperture opposite the second aperture.

9. A wheel-suspension system according to claim 1, wherein the dumbbell-shaped aperture has a dumbbell end connected by a connecting zone which tapers towards the first fixing zone.

10. A wheel-suspension system according claim 1, wherein the first aperture is arranged in the flat zone adjacent to one of the second fixing zones.

11. A wheel-suspension system according to claim 1, wherein the casting is formed of a material selected from the group consisting of cast steel, cast iron, spheroidal graphite iron, a cast light alloy, cast aluminum and a cast aluminum/magnesium alloy.

12. A wheel-suspension system according to claim 1, wherein the one-piece casting is a wishbone shape.

13. A wheel-suspension system according to claim 3 wherein the third aperture is dumbbell-shaped.

* * * * *